United States Patent Office 3,798,156
Patented Mar. 19, 1974

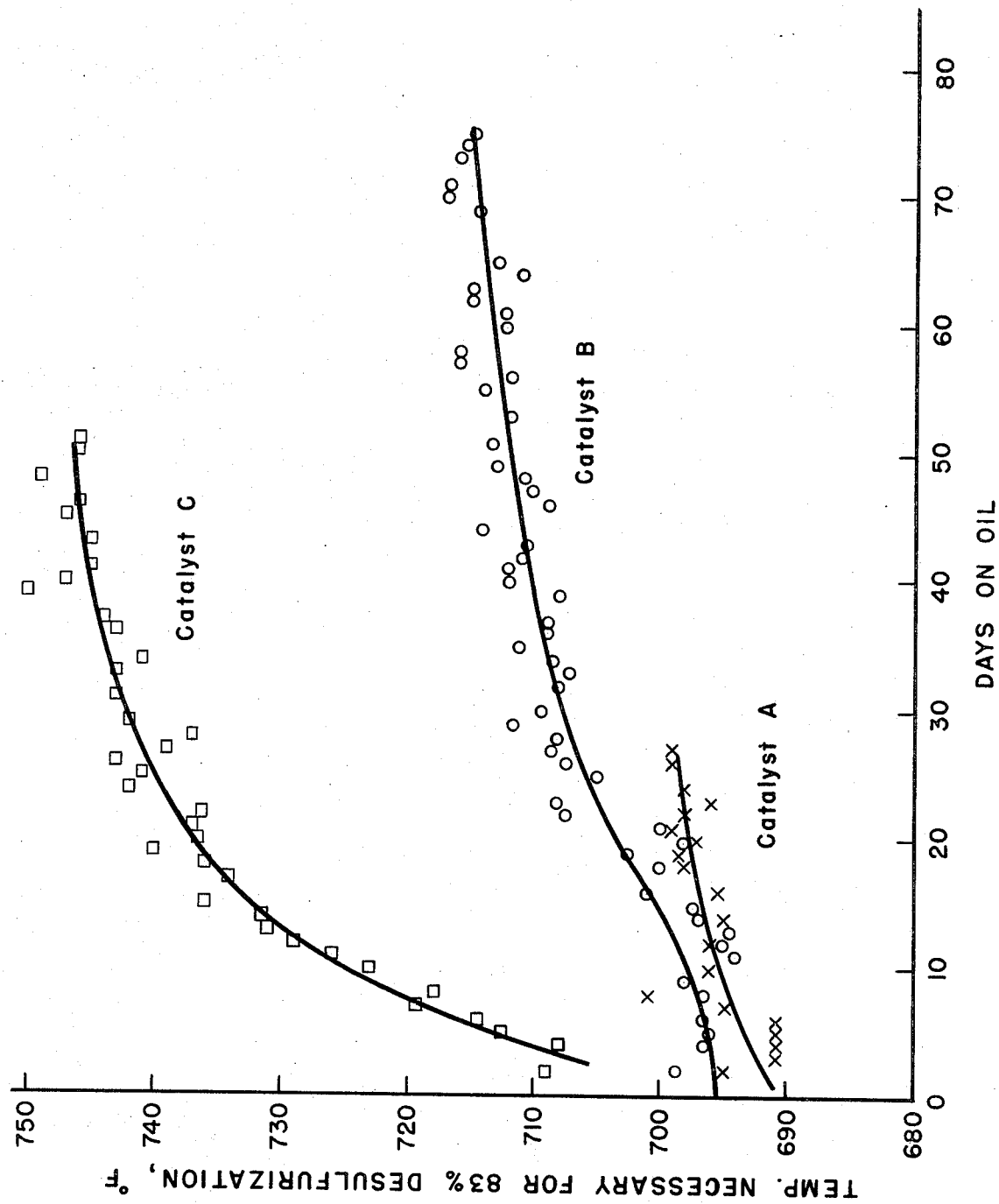

3,798,156
HYDROPROCESSING CATALYST AND PROCESS
Albert L. Hensley, Jr., Munster, Ind., assignor to
Standard Oil Company, Chicago, Ill.
Filed Sept. 22, 1971, Ser. No. 182,704
Int. Cl. C10g 23/02
U.S. Cl. 208—216                                   23 Claims

ABSTRACT OF THE DISCLOSURE

The catalyst comprises a hydrogenation component on a solid catalytic support comprising a composite of zinc oxide and a catalytically active alumina. The support comprises a maximum amount of 50 wt. percent zinc oxide, based on the weight of said support. The hydrogenation component comprises a member selected from the group consisting of a metal of Group VI-A and a metal of Group VIII of the Periodic Table of Elements, the oxides of said metals, the sulfides of said metals, and combinations thereof. A preferred Group VI-A metal is molybdenum and a preferred Group VIII metal is cobalt.

The process comprises contacting a hydrocarbon feedstock in a reaction zone with the above catalytic composition in the presence of hydrogen and under hydroprocessing conditions. An embodiment of the process is a hydrodesulfurization process.

BACKGROUND OF THE INVENTION

Suitable catalysts have been devised for the hydroprocessing of mineral oils, and the like. As considered herein, the term "hydroprocessing" comprehends the contacting of a hydrocarbon feedstock with a catalyst in the presence of hydrogen and under selected conditions to remove hetero-atoms, such as sulfur, nitrogen, and oxygen, from said feedstock and/or to saturate aromatic hydrocarbons and olefinic hydrocarbons in said feedstock. These catalysts generally contain a hydrogenation component and a suitable catalytic support. The catalytic support may be a neutral or a weakly acidic support material, such as charcoal or a catalytically active alumina. On the other hand, the catalytic support may be a strongly acidic material, such as a silica-alumina cracking catalyst or an acid-treated alumina. These catalytic compositions have been used to treat light petroleum distillates, as well as those hydrocarbon streams which contain petroleum hydrocarbon residua.

A new and novel catalytic composition has now been discovered, which catalytic composition is an improved catalyst for hydroprocessing hydrocarbon materials. This catalytic composition may be employed in a process to treat a mineral oil wherein there is a chemical alteration of at least some of the molecules of the mineral oil being treated to remove sulfur and nitrogen therefrom and to form mineral oils which have properties that are different than those of the original mineral oil.

SUMMARY OF THE INVENTION

Broadly, in accordance with the invention there is provided a catalytic composition which comprises a hydrogenation component on a solid catalytic support comprising a composite of zinc oxide and a catalytically active alumina. The catalytic support comprises a maximum amount of 50 wt. percent zinc oxide, based on the weight of said catalytic support. The hydrogenation component comprises a member selected from the group consisting of a metal of Group VI-A and a metal of Group VIII of the Periodic Table of Elements, oxides of said metals, sulfides of said metals, and combinations thereof. A preferred hydrogenation component comprises molybdenum as the Group VI-A metal and cobalt as the Group VIII metal.

According to the invention, there is provided a process for the hydroprocessing of a hydrocarbon feedstock. This process comprises contacting in a reaction zone said feedstock with the catalytic composition described hereinabove in the presence of hydrogen and under hydroprocessing conditions. Moreover, there is provided a process for the hydrodesulfurization of a hydrocarbon feedstock, which process comprises contacting in a reaction zone said feedstock with the catalytic composition described hereinabove in the presence of hydrogen and under hydrodesulfurization conditions. There is also provided a process for the hydrodesulfurization of a hydrocarbon feedstock selected from the group consisting of petroleum hydrocarbon residua, shale oil, liquified coal, oil from tar sands, and combinations thereof, which process comprises contacting in a reaction zone said feedstock with the catalytic composition described hereinabove in the presence of hydrogen and under hydrodesulfurization conditions.

BRIEF DESCRIPTION OF THE DRAWINGS

The accompanying drawing provides a comparison of the performance of three catalysts for the hydrodesulfurization of a West Texas high-sulfur resid.

DESCRIPTION AND PREFERRED EMBODIMENTS

According to the invention, there is provided a new and novel catalytic composition. This catalytic composition comprises a hydrogenation component on a solid catalytic support comprising a composite of zinc oxide and a catalytically active alumina. The catalytic support comprises a maximum amount of 50 wt. percent zinc oxide, based on the weight of said catalytic support. Advantageously, the amount of zinc oxide is in excess of 5 wt. percent, based on the weight of the catalytic composition.

It is contemplated that the hydrogenation component of the catalytic composition of the present invention may comprise one or more metals selected from Group V-A of the Periodic Table of Elements, Group VI-A of the Periodic Table of Elements, and Group VIII of the Periodic Table of Elements. Each of these metals may be present in the elemental form, as the oxide, as the sulfide, or a combination thereof. Typical examples of such metals are vanadium from Group V-A, molybdenum and tungsten from Group VI-A, and cobalt and nickel from Group VIII. The Periodic Table of Elements considered herein is found in Kirk-Othmer Encyclopedia of Chemical Technology, 2nd ed., vol. 8, Interscience Publishers, a Division of John Wiley & Sons, Inc., New York, page 94.

Preferably, the hydrogenation component comprises a member selected from the group consisting of a metal of Group VI-A and a metal of Group VIII of the Periodic Table of Elements, the oxides of said metals, the sulfides of said metals, and combinations thereof. A preferred metal of Group VI-A is molybdenum, while a preferred metal of Group VIII is cobalt. Molybdenum may be present in an amount of about 2 wt. percent to about 20 wt. percent, calculated as $MoO_3$ and based on the weight of the catalytic composition. Cobalt may be present in an amount of about 0.5 wt. percent to about 5.0 wt. percent, calculated as $CoO$ and based on the weight of the catalytic composition.

The solid catalytic support comprises a composite of zinc oxide and a catalytically active alumina. Suitably, this composite may be prepared by combining an aqueous solution of a soluble zinc compound, such as zinc acetate, zinc sulfate, or zinc chloride, with a sol or gel of a catalytically active alumina.

A preferred method for preparing the solid catalytic support of the catalytic composition of the present invention is described hereinbelow. This preferred method of preparation comprises: (1) adding an aqueous solution of a soluble zinc salt to an alumina sol; (2) thoroughly blending the aqueous solution of soluble zinc salt and the alumina sol to obtain a thoroughly blended mixture; (3) gelling said thoroughly blended mixture by adding an aqueous solution of an alkali metal hydroxide or an aqueous solution of ammonium hydroxide to said thoroughly blended mixture to provide a pH of about 5.5 to about 10.0 and to obtain a gel; (4) filtering said gel to obtain a filtered material; (5) washing said filtered material with water to remove soluble ions from the filtered material and to obtain a washed filtered material; (6) drying the washed filtered material to obtain a dried material; and (7) calcining the dried material in air at a temperature of at least 600° F. for a period of time of at least 0.5 hour. Typically, calcination employs a temperature that does not exceed 1200° F. Moreover, the period of time necessary for the calcination may extend for 24 hours. The temperature employed will dictate the amount of time required for the calcination to achieve a properly calcined catalyst.

The sol of the catalytically active alumina that is employed in the preparation of the support of the catalytic composition of the present invention is a sol of gamma-alumina, eta-alumina, or mixtures of these allotropic forms. These definitions of alumina are definitions adopted as standard nomenclature by Russel, in his brochure entitled "Alumina Properties," Technical Paper No. 10, 1953, Aluminum Company of America, and by Stumpf, et al., Ind. Eng. Chem., 42, 1950, pages 1398–1403.

The sols of suitable aluminas can be purchased from manufacturers of catalysts. For example, the sols of HF-type aluminas are available from the Nalco Chemical Company. These HF-type aluminas can be obtained with pore volumes varying from as low as 0.54 cubic centimeter per gram to as high as 2.36 cubic centimeters per gram and with corresponding average pore diameters within the range of about 72 angstroms (A.) to about 305 A. Such aluminas have surface areas varying from about 150 square meters per gram to about 500 square meters per gram, or more. In addition, sols of a suitable alumina can be obtained from the American Cyanamid Company, which alumina is a very pure alumina that is made from an electrolytic aluminum which is sodium-free. Aluminas of this type may have average pore diameters in excess 50 A. and surface areas in excess of about 100 square meters per gram.

As an alternative, the catalytic support of this invention may be prepared by co-precipitation of the alumina and zinc oxide. In this embodiment, a soluble aluminum salt and a soluble zinc salt, such as nitrates, sulfates, chlorides, or acetates, are dissolved in water and thoroughly mixed. An alkali metal hydroxide or aqueous ammonium hydroxide is added to the mixture to provide a pH of about 4 to 10 and to obtain the mixed zinc and aluminum hydroxides. The mixed hydroxides are then aged to provide the desired crystallite size and the resulting mixed hydroxide precipitate is filtered and washed with water or ammonium nitrate solution to remove alkali metal salts. After the washed filter cake is dried, it is calcined in air for 0.5 to 24 hours at a temperature between 500° F. and 1200° F. During this drying and calcination procedure, water and volatile ammonium nitrate are removed from the solid material. This support consisting of zinc oxide and alumina can then be impregnated with soluble salts of the hydrogenation metals.

The finished catalyst of the present invention may be prepared by employing the catalytic support described hereinabove. The support may be suitably prepared according to the methods outlined hereinabove. The hydrogenation component may be incorporated into the catalytic composition by impregnating upon the solid catalytic support the selected hydrogenation-dehydrogenation metals. Such impregnation may be performed according to techniques well-known in the art and will not be described herein. As an alternate method, the hydrogenation component may be introduced into the catalytic composition by adding a solution of each of the metals comprising the hydrogenation component to the sol of the support, prior to the gelling of the sol. In this way, the hydrogenation component would be thoroughly and completely dispersed throughout the composite during the blending of the composite prior to the gelling step. Either one solution containing all of the soluble salts of the metals or a solution of each soluble salt could be added to the composite.

When impregnation is employed to introduce the hydrogenation metals into the composite, the support material may be pelleted, extruded, or made into the desired shape and size either prior to or following the impregnation.

The catalytic compositions of the present invention may be employed in several embodiments of the process of the present invention for the hydroprocessing of hydrocarbon materials. According to the invention, there is provided a process for the hydroprocessing of a hydrocarbon feedstock, which process comprises contacting in a reaction zone said feedstock with the catalytic composition of the present invention in the presence of hydrogen and under hydroprocessing conditions. Suitable hydrocarbon feedstocks may comprise hydrocarbon distillates, such as naphthas and light gas oils. On the other hand, the hydrocarbon feedstocks may comprise heavier stocks, such as heavy gas oils and petroleum hydrocarbon residua. Other suitable hydrocarbon materials are shale oil, liquified coal, and oil from tar sands.

Petroleum crudes are composed of a large variety of hydrocarbons, which include heavy distillates and hydrocarbon residua. Heavy distillates boil at temperatures above about 570° F. and include the heavy gas oils and light lubricating oils. The hydrocarbon residua, which are made up of saturates, monoaromatics, polyaromatics, resins and asphalt, are found to have molecular weights ranging from about 600 to about 1,200, or above. Such hydrocarbon materials can be treated successfully by the process of the present invention.

Hydrocarbon residua are, for the most part, by-products of processes which are primarily used to obtain other petroleum products. The residual fuel oils are examples of such hydrocarbon residua. Commercial residual fuel oils have gravities which may vary betwen 8.9° and 23.5° API, flash points within the range of about 150° F. and about 450° F., and pour points within the range of about −55° F. to about 50° F. Their Conradson carson residues may fall within a range of about 0.1% to about 11.5% and their boiling points may fall within a range of about 300° F. to about 1100° F.

The heavier fractions of the various petroleum crudes will contain appreciable amounts of sulfur and nitrogen, as well as certain so-called heavy metals. For example, a vacuum reduced crude may be found to contain as much as 100 p.p.m. nickel. Metals such as these deleteriously affect the life of any catalyst over which the hydrocarbons containing such metals are being processed. It is submitted that the catalytic composition of the present invention can treat feedstocks containing such heavy metals for extended periods of time with little deleterious effect on the performance of the catalytic composition.

An embodiment of the process of the present invention is a process for the hydrodesulfurization of a hydrocarbon feedstock. During such hydrodesulfurization process, a substantial proportion of the sulfur in the feedstock is removed therefrom. Typically, the hydrodesulfurization conditions that are employed in the hydrodesulfurization process of the present invention comprise a temperature of about 500° F. to about 850° F., a hydrogen partial pressure of about 100 p.s.i.g. to about 2,000 p.s.i.g., a hydrogen-to-hydrocarbon ratio of about 200 standard cubic feet of hydrogen per barrel of hydrocarbon (s.c.f.b.) to about 15,000 s.c.f.b., a liquid hourly space velocity (LHSV) of about 0.2 to about 10.0 volumes of hydrocarbon per hour per volume of catalyst. Preferably, the hydrodesulfurization process of the present invention employs operating conditions which comprise a temperature of about 550° F. to about 800° F., a hydrogen partial pressure of about 250 p.s.i.g. to about 1,500 p.s.i.g., a hydrogen-to-hydrocarbon ratio of about 1,000 s.c.f.b. to about 10,000 s.c.f.b., and a LHSV of about 0.4 to about 5.0 volumes of hydrocarbon per hour per volume of catalyst.

If the embodiment of the process of the present invention is a process for the hydrodesulfurization of a hydrocarbon feedstock selected from the group consisting of petroleum hydrocarbon residua, shale oil, liquified coal, oil from tar sands, and combinations thereof, the operating conditions comprise a temperature of about 600° F. to about 850° F., a hydrogen partial pressure of about 600 p.s.i.g. to about 2,000 p.s.i.g., a hydrogen-to-hydrocarbon ratio of about 1,000 s.c.f.b. to about 15,000 s.c.f.b., and a LHSV of about 0.2 to about 3.0 volumes of hydrocarbon per hour per volume of catalyst.

Preferred embodiments of the catalytic composition and the process of the present invention are presented in the following examples. These examples are presented for the purpose of illustration only and are not intended to limit the scope of the present invention.

Example I

In this example, an embodiment of the catalytic composition of the present invention was prepared with the use of an alumina sol obtained from the Nalco Chemical Company. This alumina sol was a sol that would provide an HF-type alumina.

A 1000-gram portion of the Nalco alumina sol, containing about 10–11 wt. percent solids, was slurried with 2.5 liters of distilled water. This sol contained about 2.5 wt. percent sodium, based on the dry weight. A solution containing 45 grams of zinc nitrate, $Zn(NO_3)_2 \cdot 6H_2O$, dissolved in 200 milliliters of distilled water was added to the slurry. The material was thoroughly mixed and the mixture was then heated, with associated mixing. The pH of the slurry was adjusted to 7.0 by the addition of an ammonium hydroxide solution. The resulting mixture was held for 30 minutes at a temperature of 95° C. to 100° C. and then filtered. The filter cake was reslurried with 2.5 liters of distilled water and the slurry was subsequently heated to boiling. The slurry was kept at the boiling point for approximately 15 minutes. Subsequently, the slurry was filtered and the resultant filter cake was dried under a heat lamp and calcined in static air for 2 hours at a temperature of 1000° F. The calcined material comprised an embodiment of the catalytic support of the catalytic composition of the present invention.

An 82-gram portion of this catalytic support was impregnated with 90 milliliters of a solution that contained 18.3 grams of ammonium heptamolybdate, $$(NH_4)_6Mo_7O_{24} \cdot 4H_2O$$

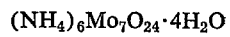

Water was removed by evaporation and the impregnated material was calcined in static air for 1 hour at a temperature of 1000° F. The impregnated material was then cooled and subsequently impregnated with 90 milliliters of an aqueous solution that contained 10.0 grams of cobalt acetate, $Co(C_2H_3O_2)_2 \cdot 4H_2O$. Excess water was removed under a heat lamp and the resultant material was calcined in static air for 2 hours at a temperature of 1000° F. This catalyst, hereinafter identified as Catalyst A, was prepared to contain 4 wt. percent cobalt oxide and 15 wt. percent molybdenum trioxide, based on the weight of the catalytic composition. The catalytic support was prepared to contain 10 wt. percent zinc oxide and 90 wt. percent alumina.

This catalyst possessed a surface area of 205 square meters per gram, a pore volume of 0.36 cubic centimeter per gram, and an average pore diameter of 67 A. It was found to have a mono-modal, very narrow pore size distribution, falling within pore diameters of about 25 A to about 150 A.

Example II

In this example, another embodiment of the catalytic composition of the present invention was prepared. In the preparation of this embodiment, an alumina sol obtained from the American Cyanamid Company was employed. This sol contained an alumina that was made from an electrolytic aluminum which was free of sodium. This sol contained about 9 wt. percent solids.

A 2000-gram portion of this alumina sol was mixed in a high-speed blender with 200 milliliters of a solution that contained 74 grams of zinc nitrate, $Zn(NO_3)_2 \cdot 6H_2O$. The resulting mixture was gelled by adding an ammonium hydroxide solution and the resultant gel was dried in static air at 60° C. (140° F.). The dried gel was then calcined in static air for 2 hours at a temperature of 500° C. (932° F.).

A 37-gram portion of the calcined material was impregnated with 40 milliliters of an aqueous solution that contained 7.5 grams of molybdenum trioxide dissolved in a dilute ammonium hydroxide solution. The water was removed by evaporation and the impregnated material was dried in static air for 0.5 hour at a temperature of 200° C. (392° F.). The dried material was then mixed with 30 milliliters of a solution that contained 5.0 grams of cobalt acetate, $Co(C_2H_3O_2)_2 \cdot 4H_2O$. The impregnated material was then dried in static air and calcined in static air for 2 hours at a temperature of 40° C. (752° F.).

This catalytic composition, hereinafter identified as Catalyst B, was prepared to contain 3 wt. percent cobalt oxide and 15 wt. percent molybdenum trioxide, based on the weight of the catalytic composition. The solid catalytic support was prepared to contain about 10 wt. percent zinc oxide and about 90 wt. percent alumina.

This catalyst was found to have a surface area of 206 square meters per gram, a pore volume of 0.26 cubic centimeters per gram, and an average pore diameter of 56 A. It possessed an essentially mono-modal, very narrow pore size distribution ranging from about 16 A. to about 170 A. No observable X-ray crystalline structure was shown by X-ray diffraction.

Example III

In this example, a typical hydroprocessing catalyt obtained from the Nalco Chemical Company was employed. This catalyst, hereinafter identified as Catalyst C, contained 3 wt. percent cobalt oxide and 15 wt. percent molybdenum trioxide on a catalytically active alumina. It possessed a surface area of 336 square meters per gram, a pore volume of 0.63 cubic centimeter per gram, and an average pore diameter of 80 A. This catalyst provided a tri-modal, relatively broad pore size distribution, the pore diameters ranging from about 25 A. to about 600 A.

Example IV

Each of the catalysts in Examples I–III was tested for its ability to hydrodesulfurize a West Texas high-sulfur resid. This petroleum hydrocarbon feedstock contained 13.2 volume percent (12.10 wt. percent) material boiling to 650° F., 43.4 volume percent (41.8 wt. percent) material boiling between 650° F. and 1000° F., and 43.3 volume percent (46.3 wt. percent) material boiling at 1000° F. and above. The API gravity of this feedstock was 15.4°. Its pour point was 80° F. and it possessed a Ramsbottom carbon value of 7.9 wt. percent and contained 3.62 wt. percent sulfur and 11.1 wt. percent hydrogen. It contained 16 p.p.m. nickel and 25 p.p.m. vanadium.

Each of these tests was conducted in a bench-scale test unit having automatic controls for pressure, flow of reactants, and temperature. In each unit, the reactor was made from ⅜-in. inside diameter stainless steel heavy-wall tubing. In each case, a ⅛-in. outside diameter thermowell extended up through the center of the reactor. The reactor was heated by an electrically heated steel block. Hydrocarbon feed was fed to the unit by means of a Ruska pump, a positive displacement pump. For each test, 17.0 cubic centimeters of catalyst was employed. The catalyst was present in the form of 14–20 mesh material and was supported on 10–14 mesh Alundum particles. A 1-inch layer of 10–14-mesh alundum particles was placed over the catalyst bed in the reactor. In each case, the catalyst was placed in the annular space between the thermowell and the internal wall of the ⅜-in. reactor. For Catalysts A and B, the reactor was 30 inches in length, while the reactor employed for Catalyst C was 40 inches in length. The hydrocarbon feed and hydrogen were introduced into the top of the reactor and flowed downwardly through the reactor. In each case, effluent from the reactor was collected in a liquid product receiver, while he gas from the reactor was passed through the product receiver to a pressure control valve and then through a wet test meter to an appropriate vent.

For each test, the appropriate unit was operated at a pressure of 900 p.s.i.g., a LHSV of 0.6 volume of hydrocarbon per hour per volume of catalyst, and a hydrogen-to-hydrocarbon ratio of about 8000 s.c.f.b. to about 9000 s.c.f.b. The data obtained for each run were corrected to the temperature that was necessary to provide 83 wt. percent desulfurization of the feedstock employed. This provided a 0.6 wt. percent sulfur content in the total liquid product. The corrected data are presented in the accompanying figure.

The desulfurization activity of a catalyst may be expressed in terms of the temperature that is required to provided a certain amount of desulfurization. A catalyst is more active than another catalyst when the temperature that it needs is lower than the temperature that is required for the other catalyst to provide comparable desulfurization. For example, a catalyst with twice the activity of a second one will give the same desulfurization when operating at a 40° F. lower temperature, or it will give the same desulfurization at the same temprature when operating at twice the liquid hourly space velocity. As the catalyst deactivates by deposition of metals or coke, it is necessary to raise the temperature to compensate for this decline in catalyst activity. However, when the temperature is raised to 800–850° F., cracking reactions and coke formation become excessive. Then the process cycle must be terminated and the catalyst regenerated or replaced.

It can be easily seen from the accompanying figure that both Catalysts A and B, embodiments of the catalytic composition of the present invention, are much more active than the typical desulfurization catalyst, Catalyst C, for the hydrodesulfurization of the West Texas high-sulfur resid that was employed in these tests.

The tests employing the catalysts which are embodiments of the catalytic composition of the present invention comprise embodiments of the process of the present invention.

What is claimed is:

1. A catalytic composition which comprises a hydrogenation component on a solid catalytic support comprising a composite of zinc oxide and a catalytically active alumina, said hydrogenation component comprising a member selected from the group consisting of a metal of Group VI–A and a metal of Group VIII of the Periodic Table of Elements, the oxides of said metals, the sulfides of said metals, and combinations thereof, and said catalytic support being prepared by: (1) adding an aqueous solution of soluble zinc salt to an alumina sol; (2) thoroughly blending the aqueous solution of soluble zinc salt and the alumina sol to obtain a thoroughly blended mixture; (3) gelling said thoroughly blended mixture by adding an aqueous solution of an alkali metal hydroxide or a solution of ammonium hydroxide to said thoroughly blended mixture to provide a pH of about 5.5 to about 10.0 and to obtain a gel; (4) filtering said gel to obtain a filtered material; (5) washing said filtered material with water to remove soluble ions from the filtered material and to obtain a washed filtered material; (6) drying said washed filtered material to obtain a dried material; and (7) calcining said dried material in air at a temperature of at least 600° F. for a period of time of at least 0.5 hour.

2. The catalytic composition of claim 1 wherein said catalytic support comprises a maximum amount of about 50 wt. percent zinc oxide, based on the weight of said catalytic support.

3. The catalytic composition of claim 1 wherein said hydrogenation component comprises cobalt and molybdenum, said cobalt being present in an amount of about 0.5 to about 5 wt. percent, calculated as CoO and based on the weight of said catalytic composition, and said molybdenum being present in an amount of about 2 to about 20 wt. percent, calculated as $MoO_3$ and based on the weight of said catalytic composition.

4. A process for the hydroprocessing of a hydrocarbon feedstock, which process comprises contacting in a reaction zone said feedstock with the catalytic composition of claim 1 in the presence of hydrogen and under hydroprocessing conditions.

5. A process for the hydrodesulfurization of a hydrocarbon feedstock, which process comprises contacting in a reaction zone said feedstock with the catalytic composition of claim 1 in the presence of hydrogen and under hydrodesulfurization conditions.

6. The catalytic composition of claim 2 wherein said hydrogenation component comprises cobalt and molybdenum, said cobalt being present in an amount of about 0.5 to about 5 wt. percent, calculated as CoO and based on the weight of said catalytic composition, and said molybenum being present in an amount of about 2 to about 20 wt. percent, calculated as $MoO_3$ and based on the weight of said catalytic composition.

7. A process for the hydrodesulfurization of a hydrocarbon feedstock, which process comprises contacting in a reaction zone said feedstock with the catalytic composition of claim 2 in the presence of hydrogen and under hydrodesulfurization conditions.

8. A process for the hydrodesulfurization of a hydrocarbon feedstock, which process comprises contacting in a reaction zone said feedstock with the catalytic composition of claim 3 in the presence of hydrogen and under hydrodesulfurization conditions.

9. The process of claim 5 wherein said hydrodesulfurization conditions comprise a temperature of about 500° F. to about 850° F., a hydrogen partial pressure of about 100 p.s.i.g. to about 2,000 p.s.i.g., a hydrogen-to-hydrocarbon ratio of about 200 s.c.f.b. to about 15,000 s.c.f.b., and a LHSV of about 0.2 to about 10.0 volumes of hydrocarbon per hour per volume of catalyst.

10. The process of claim 5 wherein said feedstock is a member selected from the group consisting of petroleum hydrocarbon residua, shale oil, liquified coal, oil from tar sands, and combinations thereof.

11. The process of claim 7 wherein said hydrodesulfurization conditions comprise a temperature of about 500° F. to about 850° F., a hydrogen partial pressure of about 100 p.s.i.g. to about 2,000 p.s.i.g., a hydrogen-to-hydrocarbon ratio of about 200 s.c.f.b. to about 15,000 s.c.f.b., and a LHSV of about 0.2 to about 10.0 volumes of hydrocarbon per hour per volume of catalyst.

12. The process of claim 7 wherein said feedstock is a member selected from the group consisting of petroleum hydrocarbon residua, shale oil, liquified coal, oil from tar sands, and combinations thereof.

13. The process of claim 8 wherein said hydrodesulfurization conditions comprise a temperature of about 500° F. to about 850° F., a hydrogen partial pressure of about 100 p.s.i.g. to about 2,000 p.s.i.g., a hydrogen-to-hydrocarbon ratio of about 200 s.c.f.b. to about 15,000 s.c.f.b., and a LHSV of about 0.2 to about 10.0 volumes of hydrocarbon per hour per volume of catalyst.

14. The process of claim 8 wherein said feedstock is a member selected from the group consisting of petroleum hydrocarbon residua, shale oil, liquified coal, oil from tar sands, and combinations thereof.

15. The process of claim 10 wherein said hydrodesulfurization conditions comprise a temperature of about 600° F. to about 850° F., a hydrogen partial pressure of about 600 p.s.i.g. to about 2,000 p.s.i.g., a hydrogen-to-hydrocarbon ratio of about 1,000 s.c.f.b. to about 15,000 s.c.f.b., and a LHSV of about 0.2 to about 3.0 volumes of hydrocarbon per hour per volume of catalyst.

16. The process of claim 12 wherein said hydrodesulfurization conditions comprise a temperature of about 600° F. to about 850° F., a hydrogen partial pressure of about 600 p.s.i.g. to about 2,000 p.s.i.g., a hydrogen-to-hydrocarbon ratio of about 1,000 s.c.f.b. to about 15,000 s.c.f.b., and a LHSV of about 0.2 to about 3.0 volumes of hydrocarbon per hour per volume catalyst.

17. The process of claim 14 wherein said hydrodesulfurization conditions comprise a temperature of about 600° F. to about 850° F., a hydrogen partial pressure of about 600 p.s.i.g. to about 2,000 p.s.i.g., a hydrogen-to-hydrocarbon ratio of about 1,000 s.c.f.b. to about 15,000 s.c.f.b., and a LHSV of about 0.2 to about 3.0 volumes of hydrocarbon per hour per volume of catalyst.

18. A catalytic composition which comprises a hydrogenation component on a solid catalytic support comprising a composite of zinc oxide and a catalytically active alumina, said hydrogenation component comprising a member selected from the group consisting of cobalt and molybdenum, the oxides of said metals, the sulfides of said metals, and combinations thereof, said cobalt being present in an amount of about 0.5 to about 5 wt. percent, calculated as CoO and based on the weight of said catalytic composition, and said molybdenum being present in an amount of about 2 to about 20 wt. percent, calculated as $MoO_3$ and based on the weight of said catalytic composition, said zinc oxide being present in an amount that is in excess of 5 wt. percent, based on the weight of said catalytic composition, the maximum amount of zinc oxide being about 50 wt. percent, based on the weight of said catalytic support, and said catalytic support being prepared by: (1) adding an aqueous solution of soluble zinc salt to an alumina sol; (2) thoroughly blending the aqueous solution of soluble zinc salt and the alumina sol to obtain a thoroughly blended mixture; (3) gelling said thoroughly blended mixture by adding an aqueous solution of an alkali metal hydroxide or a solution of ammonium hydroxide to said thoroughly blended mixture to provide a pH of about 5.5 to about 10.0 and to obtain a gel; (4) filtering said gel to obtain a filtered material; (5) washing said filtered material with water to remove soluble ions from the filtered material and to obtain a washed filtered material; (6) drying said washed filtered material to obtain a dried material; and (7) calcining said dried material in air at a temperature of at least 600° F. for a period of time of at least 0.5 hour.

19. A process for the hydrodesulfurization of a hydrocarbon feedstock, which process comprises contacting in a reaction zone said feedstock with the catalytic composition of claim 18 in the presence of hydrogen and under hydrodesulfurization conditions.

20. The process of claim 19 wherein said hydrodesulfurization conditions comprise a temperature of about 500° F. to about 850° F., a hydrogen partial pressure of about 100 p.s.i.g to about 2,000 p.s.i.g., a hydrogen-to-hydrocarbon ratio of about 200 s.c.f.b. to about 15,000 s.c.f.b., and a LHSV of about 0.2 to about 10.0 volumes of hydrocarbon per hour per volume of catalyst.

21. A process of claim 19 wherein said hydrodesulfurization conditions comprise a temperature of about 550° F. to about 800° F., a hydrogen partial pressure of about 250 p.s.i.g. to about 1,500 p.s.i.g., a hydrogen-to-hydrocarbon ratio of about 1,000 s.c.f.b. to about 10,000 s.c.f.b., and a LHSV of about 0.4 to about 5.0 volumes of hydrocarbon per hour per volume of catalyst.

22. The process of claim 19 wherein said feedstock is a member selected from the group consisting of petroleum hydrocarbon residua, shale oil, liquified coal, oil from tar sands, and combinations thereof.

23. The process of claim 22 wherein said hydrodesulfurization conditions comprise a temperature of about 600° F. to about 850° F., a hydrogen partial pressure of about 600 p.s.i.g. to about 2,000 p.s.i.g., a hydrogen-to-hydrocarbon ratio of about 1,000 s.c.f.b. to about 15,000 s.c.f.b., and a LHSV of about 0.2 to about 3.0 volumes of hydrocarbon per hour per volume of catalyst.

References Cited
UNITED STATES PATENTS

| | | | |
|---|---|---|---|
| 2,967,820 | 1/1961 | Johnson et al. | 208—112 |
| 3,649,525 | 3/1972 | Hilfman | 208—210 |
| 3,627,674 | 12/1971 | Nagl | 208—216 |
| 2,822,336 | 2/1958 | Polack | 252—475 |

DELBERT E. GANTZ, Primary Examiner

J. W. HELLWEGE, Asssitant Examiner

U.S. Cl. X.R.

252—465, 470, 475

O-1050
5/69)

UNITED STATES PATENT OFFICE
CERTIFICATE OF CORRECTION

Patent No. 3,798,156                    Dated March 19, 1974

Inventor(s) Albert L. Hensley, Jr.

It is certified that error appears in the above-identified patent and that said Letters Patent are hereby corrected as shown below:

Column 4, line 20, "compositions" should be -- composition --;
line 53, "carson" should be -- carbon --.

Column 5, line 71, "4 wt." should be -- 3 wt. --.

Column 6, line 34, "40°C. should be -- 400°C. --;
line 64, "12.10 wt.%" should be -- 12.0 wt.% --.

Column 9, line 21, "volume catalyst" should be -- volume of catalyst --.

Signed and sealed this 17th day of September 1974.

(SEAL)
Attest:

McCOY M. GIBSON JR.                    C. MARSHALL DANN
Attesting Officer                      Commissioner of Patents